US012625876B2

(12) United States Patent
Fox et al.

(10) Patent No.: US 12,625,876 B2
(45) Date of Patent: May 12, 2026

(54) EXTENSIBLE DATA ENCLAVE PATTERN

(71) Applicant: MASTERCARD TECHNOLOGIES CANADA ULC, Vancouver (CA)

(72) Inventors: Justine Celeste Fox, Pitt Meadows (CA); Yanis Ikene, Vancouver (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 68 days.

(21) Appl. No.: 18/597,024

(22) Filed: Mar. 6, 2024

(65) Prior Publication Data

US 2024/0303248 A1     Sep. 12, 2024

Related U.S. Application Data

(60) Provisional application No. 63/488,881, filed on Mar. 7, 2023.

(51) Int. Cl.
*G06F 16/25*     (2019.01)
*G06F 16/22*     (2019.01)
*G06F 16/28*     (2019.01)
*G06F 21/62*     (2013.01)

(52) U.S. Cl.
CPC ........ *G06F 16/254* (2019.01); *G06F 16/2228* (2019.01); *G06F 16/285* (2019.01); *G06F 21/6218* (2013.01)

(58) Field of Classification Search
CPC .. G06F 16/254; G06F 16/285; G06F 16/2228; G06F 21/6218
USPC ......................................................... 707/769
See application file for complete search history.

(56) References Cited

U.S. PATENT DOCUMENTS

| | | | | |
|---|---|---|---|---|
| 10,528,522 | B1 * | 1/2020 | Todd ...................... | G06F 16/215 |
| 10,713,272 | B1 * | 7/2020 | Caldwell ............. | G06F 16/2358 |
| 10,846,307 | B1 * | 11/2020 | Dudami ............ | G06F 16/24573 |
| 10,997,196 | B2 * | 5/2021 | Tong ................... | G06F 16/2455 |
| 11,080,264 | B1 * | 8/2021 | Joffe ................... | G06F 16/2358 |
| 11,119,980 | B2 * | 9/2021 | Szczepanik ............. | G06F 16/13 |
| 11,294,929 | B1 * | 4/2022 | Patil ....................... | C02F 1/008 |

(Continued)

OTHER PUBLICATIONS

International Search Report and Written Opinion for Application No. PCT/CA2024/050269 dated Jun. 21, 2024 (10 pages).

(Continued)

*Primary Examiner* — Hanh B Thai
(74) *Attorney, Agent, or Firm* — Michael Best & Friedrich LLP

(57)     ABSTRACT

Systems, methods, and non-transitory computer-readable media for forming an extensible data warehouse. A data ingestor application receiving raw data having a first structure. Forming a data lake in the third memory using the raw data. Continuously receive additional raw data having a plurality of structures. The plurality of structures including the first structure and one or more different structures. The additional raw data supplementing the raw data. Determining each structure of the plurality of structures. Generating a dataset based on the additional raw data and the plurality of structures that are determined. Extracting metadata associated with the additional raw data from the dataset. Creating a catalog of the dataset based on the metadata that is extracted. Modifying the data lake in the third memory to include the additional raw data based on the dataset and the catalog.

20 Claims, 6 Drawing Sheets

(56) References Cited

U.S. PATENT DOCUMENTS

| | | | | |
|---|---|---|---|---|
| 11,449,508 B2 * | 9/2022 | Potharaju | .......... | G06F 16/24542 |
| 11,461,356 B2 * | 10/2022 | Wilson | .................. | G06F 16/951 |
| 11,907,196 B1 * | 2/2024 | Thunuguntla | .......... | G06F 16/25 |
| 12,174,975 B2 * | 12/2024 | Huang | ................ | G06F 16/9024 |
| 2008/0148041 A1 * | 6/2008 | Carlson | .................. | G06F 21/79 |
| | | | | 709/230 |
| 2016/0103480 A1 * | 4/2016 | Sanghi | ................. | G06F 1/3228 |
| | | | | 713/323 |
| 2016/0253364 A1 * | 9/2016 | Gomadam | ......... | G06F 16/9024 |
| | | | | 707/739 |
| 2017/0308856 A1 * | 10/2017 | Bursey | ................. | G06F 16/254 |
| 2018/0089328 A1 * | 3/2018 | Bath | ..................... | G06F 16/901 |
| 2018/0336228 A1 * | 11/2018 | Krog Iverson | ....... | G06F 40/205 |
| 2018/0373781 A1 * | 12/2018 | Palrecha | .................. | G06N 3/08 |
| 2020/0004862 A1 * | 1/2020 | Bauer | ................. | G06F 16/254 |
| 2020/0026710 A1 * | 1/2020 | Przada | .................. | G06N 20/00 |
| 2020/0174966 A1 * | 6/2020 | Szczepanik | ............ | G06F 16/13 |
| 2020/0301941 A1 * | 9/2020 | Wilson | ................. | G06F 16/252 |
| 2020/0349045 A1 * | 11/2020 | Van De Groenendaal | .................. | |
| | | | | G06F 11/34 |
| 2021/0349901 A1 * | 11/2021 | Potharaju | ......... | G06F 16/24542 |
| 2021/0350167 A1 * | 11/2021 | Wray | ............ | G06Q 10/063112 |
| 2021/0357420 A1 * | 11/2021 | Chandhoke | ........ | G06F 16/2282 |
| 2021/0357421 A1 * | 11/2021 | Chandhoke | .......... | G06F 16/164 |
| 2021/0374143 A1 * | 12/2021 | Neill | .................. | G06F 16/9024 |
| 2022/0083501 A1 * | 3/2022 | Joffe | ..................... | G06F 16/116 |
| 2022/0327119 A1 * | 10/2022 | Gasper | ............... | G06F 16/9024 |
| 2022/0398186 A1 * | 12/2022 | Mudumba | ........... | G06F 11/3688 |
| 2022/0405298 A1 * | 12/2022 | Wilson | .................. | G06F 16/252 |
| 2022/0405619 A1 * | 12/2022 | Ramamurthy | ...... | G06F 16/9024 |
| 2023/0062655 A1 * | 3/2023 | Wan | ...................... | G06F 16/254 |
| 2023/0100289 A1 * | 3/2023 | Kare | .................... | G06F 16/252 |
| | | | | 707/702 |
| 2023/0195918 A1 * | 6/2023 | Chen | .................. | G06F 9/30101 |
| | | | | 726/30 |
| 2023/0222138 A1 * | 7/2023 | Liu | ....................... | G06F 16/284 |
| | | | | 707/602 |
| 2023/0229674 A1 * | 7/2023 | Shemer | ............... | G06F 16/2282 |
| | | | | 707/802 |
| 2023/0289354 A1 * | 9/2023 | Branton | ........... | G06F 16/24573 |
| 2023/0394043 A1 * | 12/2023 | Kalmanek, Jr. | ..... | G06F 16/2457 |
| 2024/0028264 A1 * | 1/2024 | Yam | ...................... | G06F 3/0647 |
| 2024/0311681 A1 * | 9/2024 | Shah | ..................... | G06N 20/00 |
| 2024/0403277 A1 * | 12/2024 | Shao | ..................... | G06F 16/215 |
| 2025/0139271 A1 * | 5/2025 | Tonry | ................. | G06F 21/6218 |

OTHER PUBLICATIONS

Wrembel, R . . . "Still Open Problems in Data Warehouse and Data Lake Research." 2021 Eighth International Conference on Social Network Analysis, Management and Security (SNAMS). IEEE, 2021 (3 pages).

Babuji, Y. N., et al. "A secure data enclave and analytics platform for social scientists." 2016 IEEE 12th International Conference on e-Science (e-Science). IEEE, 2016, 337-342.

* cited by examiner

EXTENSIBLE DATA ENCLAVE PATTERN

RELATED APPLICATION

This application claims priority to U.S. Provisional Patent Application No. 63/488,881, filed on Mar. 7, 2023, the entire contents of which are hereby incorporated by reference.

FIELD OF THE INVENTION

The present disclosure relates generally to data enclaves. More specifically, the present disclosure relates to systems, methods, and non-transitory computer-readable media for forming an extensible data warehousing platform with built-in data security controls.

BACKGROUND

A data enclave is a tool designed to share information derived from raw data rather than sharing the actual raw data. Data enclaves provide a confidential, protected environment in which authorized users can access sensitive data remotely while providing a secure dissemination platform. In a networked database, data enclaves make available only aggregate results, such as coefficients and counts. Data enclaves are implemented as a cloud-based platform that replaces on-premise infrastructure and provides both the safe storage of datasets and scalable computing resources that operate on raw data that no longer needs to be on the user's physical desktop computer.

SUMMARY

The transformation of raw data into business insights and information in real time and/or a batch process is growing increasingly more problematic due to how fast software development teams are trying to produce and create new pieces of software, and new data sources collect new data from consumers. Due to the increasingly more detailed data payloads, solutions are needed to make the payloads accessible to gain actual business value. While you can scale data ingestion, data storage and data access with fixed data structures, it is common to encounter variable data structures and mutating data attributes that break data analysis and big data pipeline tools, which result in a nonfunctioning data lake because something has changed in a data store in a recent deploy.

To solve the challenges with variable data structures (e.g., freeform text data, JSON, comma deliminated, pipe deliminated, missing or additional columns) and mutating data attributes, a platform is needed to collect, manage, organize, sort, process an unlimited amount of different data repositories into a data lake with full data access control and the ability to extract, transform, and load data with as minimal human involvement as possible. In one instance, a platform is designed to flexibly accommodate (e.g., horizontally scale) a fast-paced product development environment where data structures may change unexpectedly that combines big data pipeline concepts with the concept of a data lake that stores data in any format.

Another benefit of the platform described herein is that the ability to automatically detect the format of data and make the data available in a data warehousing platform for data analytics for data science with built in rigorous data processing and data security controls to ensure that privacy, integrity, and confidentiality of the data access usage.

One embodiment described herein is a system forming an extensible data warehouse. The system includes a client device including a first electronic processor and a first memory, a storage device including a second electronic processor and a second memory, and a server including a third electronic processor and a third memory. The third memory includes a data ingestor application. The data ingestor application receiving raw data having a first structure, forming a data lake in the third memory using the raw data, continuously receiving additional raw data having a plurality of structures, wherein the plurality of structures includes the first structure and one or more different structures, and wherein the additional raw data supplements the raw data, determining each structure of the plurality of structures, generating a dataset based on the additional raw data and the plurality of structures that are determined, extracting metadata associated with the additional raw data from the dataset, creating a catalog of the dataset based on the metadata that is extracted, and modifying the data lake in the third memory to include the additional raw data based on the dataset and the catalog.

Another embodiment described herein is a method. The method includes receiving, with a data ingestor application, raw data having a first structure. The method includes forming, with the data ingestor application, a data lake in a third memory of a server using the raw data. The method includes continuously receiving, with a data ingestor application, additional raw data having a plurality of structures, wherein the plurality of structures includes the first structure and one or more different structures, and wherein the additional raw data supplements the raw data. The method includes determining, with the data ingestor application, each structure of the plurality of structures. The method includes generating, with the data ingestor application, a dataset based on the additional raw data and the plurality of structures that are determined. The method includes extracting, with the data ingestor application, metadata associated with the additional raw data from the dataset. The method includes creating, with the data ingestor application, a catalog of the dataset based on the metadata that is extracted. The method includes modifying, with the data ingestor application, the data lake in the third memory to include the additional raw data based on the dataset and the catalog.

Yet another embodiment described herein is a non-transitory computer-readable medium comprising instructions that, when executed by an electronic processor, cause the electronic processor to perform a set of operations. The set of operations includes receiving raw data having a first structure. The set of operations includes forming a data lake in a third memory using the raw data. The set of operations includes continuously receiving additional raw data having a plurality of structures, wherein the plurality of structures includes the first structure and one or more different structures, and wherein the additional raw data supplements the raw data. The set of operations includes determining each structure of the plurality of structures. The set of operations includes generating a dataset based on the additional raw data and the plurality of structures that are determined. The set of operations includes extracting metadata associated with the additional raw data from the dataset. The set of operations includes creating a catalog of the dataset based on the metadata that is extracted. The set of operations includes modifying the data lake in the third memory to include the additional raw data based on the dataset and the catalog.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
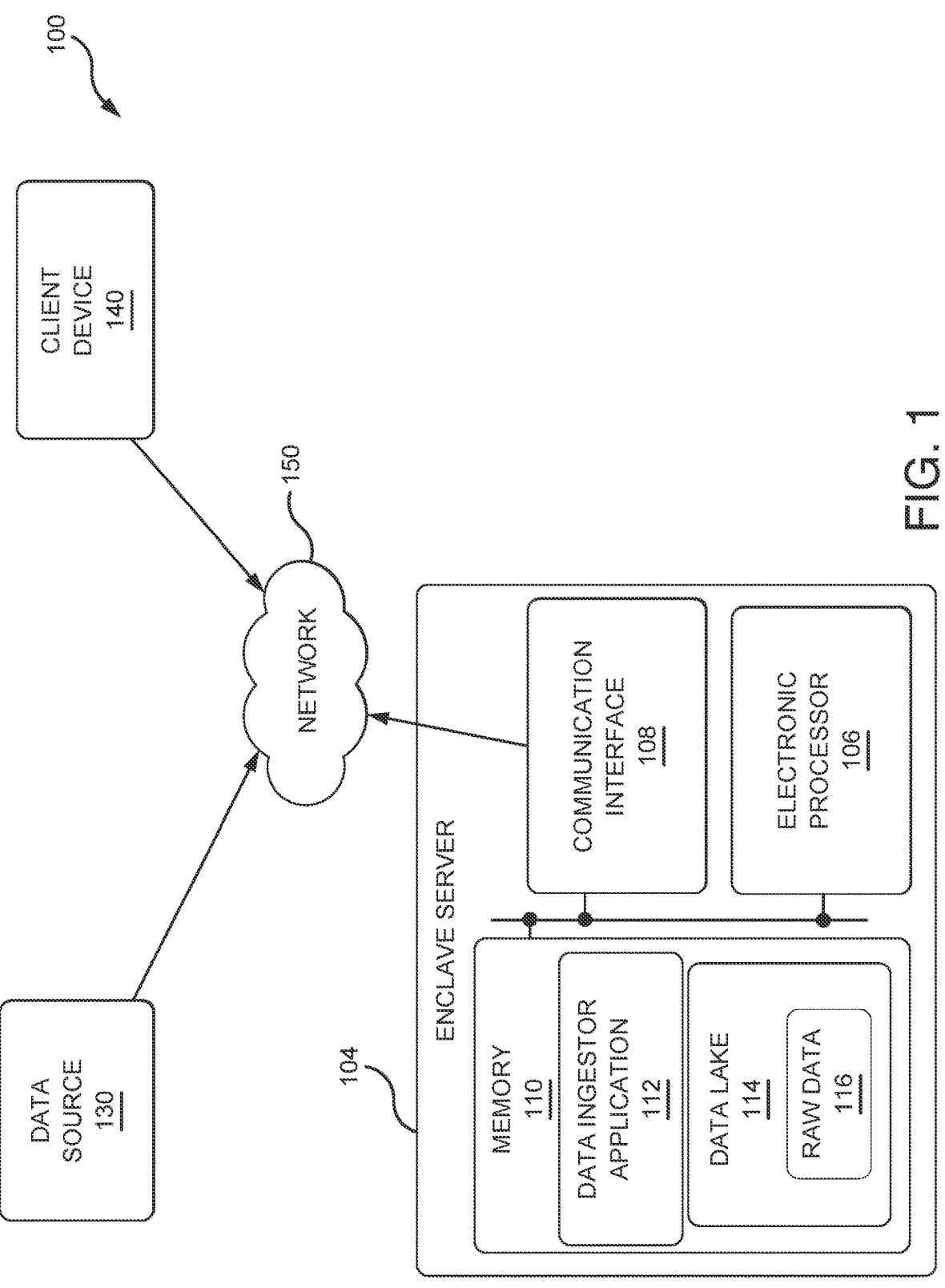
FIG. 1 is a block diagram illustrating an example system for forming an extensible data warehousing platform with built-in data security controls, in accordance with various aspects of the present disclosure.

FIG. 1 is a block diagram illustrating an example system for forming an extensible data warehousing platform with built-in data security controls, in accordance with various aspects of the present disclosure. In the example of FIG. 1, the system 100 includes an enclave server 104, a data source 130, a client device 140, and a network 150.

The enclave server 104 may be owned by, or operated by or on behalf of, an administrator. The enclave server 104 includes an electronic processor 106, a communication interface 108, and a memory 110. The electronic processor 106 is communicatively coupled to the communication interface 108 and the memory 110. The electronic processor 106 is a microprocessor or another suitable processing device. The communication interface 108 may be implemented as one or both of a wired network interface and a wireless network interface. The memory 110 is one or more of volatile memory (e.g., RAM) and non-volatile memory (e.g., ROM, FLASH, magnetic media, optical media, et cetera). In some examples, the memory 110 is also a non-transitory computer-readable medium. Although shown within the enclave server 104, the memory 110 may be, at least in part, implemented as network storage that is external to the enclave server 104 and accessed via the communication interface 108. For example, all or part of memory 110 may be housed on the "cloud."

The data ingestor application 112 may be stored within a transitory or non-transitory portion of the memory 110. The data ingestor application 112 includes machine readable instructions that are executed by the electronic processor

106 to perform the functionality of the enclave server 104 as described below with respect to FIGS. 2-6.

The memory 110 may include a data lake 114 for storing a raw data 116. The data lake 114 may be a centralized repository designed to store, process, and secure large amounts of structured, semi-structured, and unstructured data in its native format until the data is requested for analytics applications. The raw data 116 may be data that comes from on-premises, cloud, or edge-computing systems. For example, the raw data 116 may include a database of information that employs a Resource Description Framework or another suitable database with features similar to the features of the Resource Description Framework, and various non-SQL databases, knowledge graphs, etc. The database may include data associated with and contain personal information about a user, device identifiers, device reputation, device legitimacy, logs, cyber-attack information, or the like.

The data source 130 may be data that comes from on-premises, cloud, or edge-computing systems that may include an electronic processor in communication with memory. The electronic processor is a microprocessor or another suitable processing device, the memory is one or more of volatile memory and non-volatile memory, and the communication interface may be a wireless or wired network interface. In some examples, the data source 130 may directly communicate with the enclave server 104. In other examples, the data source 130 may indirectly communicate over the network 150. For example, the data source 130 may be a source of the raw data 116 ingested by the enclave server 104 via the network 150. In this example, the raw data 116 may include containers that include objects and metadata that describe the objects, databases of current or historical information, large streams of data records in real time, or the like.

The client device 140 may be web-compatible mobile computer, such as a laptop, a tablet, a smart phone, or other suitable computing device. Alternately, or in addition, the client device 140 may be a desktop computer. The client device 140 includes an electronic processor in communication with memory. The electronic processor is a microprocessor or another suitable processing device, the memory is one or more of volatile memory and non-volatile memory, and the communication interface may be a wireless or wired network interface.

An application, which contains software instructions implemented by the electronic processor of the client device 140 to perform the functions of the client device 140 as described herein, is stored within a transitory or a non-transitory portion of the memory. The application may have a graphical user interface that facilitates interaction between a user and the client device 140.

The client device 140 may communicate with the enclave server 104 over the network 150. The network 150 is preferably (but not necessarily) a wireless network, such as a wireless personal area network, local area network, or other suitable network. In some examples, the client device 140 may directly communicate with the enclave server 104. In other examples, the client device 140 may indirectly communicate with the enclave server 104 over network 150.

The enclave server 104 may likewise communicate with partner devices other than the data source 130 and the client device 140. The workings of the enclave server 104, the data source 130, and the client device 140 will now be described in additional detail with respect to FIGS. 2-6.

Figure 2:
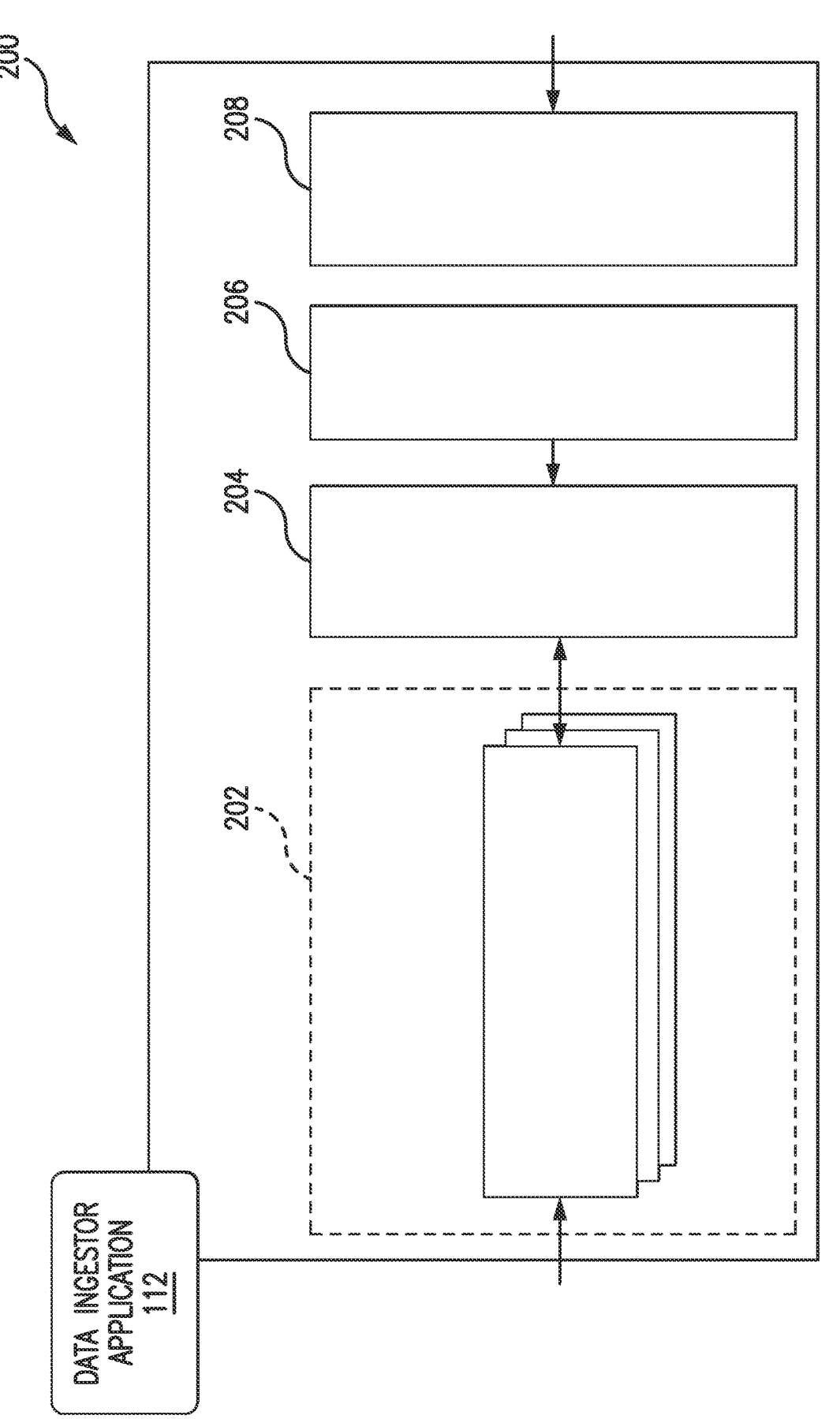
FIG. 2 is a block diagram illustrating an example application for forming a data lake of the example system of FIG. 1, in accordance with various aspects of the present disclosure.

FIG. 2 is a block diagram illustrating an example application for forming and operating a data lake of the example system of FIG. 1, in accordance with various aspects of the present disclosure. In the example of FIG. 2, the data ingestor application 112 performs a task operation 200 to form the data lake 114. The task operation 200 includes a workflow orchestration 202, a data lake formation 204, a data transformation 206, and a data analytics access 208. The data ingestor application 112 utilizes the workflow orchestration 202 to ingest, cleanse, transform, and organize the data. For example, the data may be received from the data source 130 and/or the client device 140 of FIG. 1. The data ingestor application 112 utilizes the data lake formation 204 to create and manage a data catalog containing metadata about the data in the data lake 114. The data ingestor application 112 utilizes the data transformation 206 to enable users to clean and normalize data without writing any code. The data ingestor application 112 utilizes the data analytics access 208 to enable users to query the data in the data lake 114.

The workflow orchestration 202 defines a logical flow of a set of actions that ingest data of a source system, such as the data source 130, and move the data to a target repository for storage and analysis. Also, the defined set of actions may transform the ingested data using a set of data processing elements. For example, the set of data processing elements are connected in series, where the output of one element is the input of the next element. In this example, the set of data processing elements may include an input crawler, an extract, transform, load (ETL) tool, and an output crawler. The workflow orchestration 202 may utilize the input crawler to classify ingested data to determine a format (e.g., JSON, CSV, Apache Avro, or other custom formats), schema, and/or associated properties (e.g., compressed file formats and compression types) of the ingested data.

The workflow orchestration 202 may utilize the input crawler to group the ingested data into tables or partitions. The workflow orchestration 202 may also utilize the input crawler to create metadata tables to store in a metadata repository (e.g., data catalog) of a database. The workflow orchestration 202 may utilize the ETL tool to organize, cleanse, validate, and format data (semi-structured data, such as clickstream or process logs) for storage in a data warehouse or data lake. In some implementations, the workflow orchestration 202 transforms, flattens, and enriches data from a source to a target. The workflow orchestration 202 may utilize the output crawler to classify the data output by the ETL tool and compact small source files in partitions into a larger file size to enable faster reading, writing, and querying of the data. For example, the workflow orchestration 202 aggregates small log files, such as, for example, a log file with a file size that is less than one (1) megabyte (MB), from disparate servers to larger file sizes (e.g., 128 MB, 256 MB, 512 MB, etc.) based on a configuration of an application pattern. Aggregated files are more efficient to query by a CPU than multipart files. The majority of queries on a large dataset will query many "larger" sized files to answer a query, however query coordination on traditional methods and patterns begins to have performance issues when the query requires resources beyond thirty two (32) worker nodes. The workflow orchestration 202 may also utilize the output crawler to create metadata tables to store in a metadata repository (e.g., data catalog).

The data ingestor application 112 utilizes the data lake formation 204 to build, secure, and manage data lakes. The data lake formation 204 combines different types of structured, semi-structured, and unstructured data into a centralized repository. The data lake formation 204 reads the data from the workflow orchestration 202 and the data's metadata (e.g., schema, structure, etc.) to understand the contents of the data source and imports the data to the data lake 114 and records the metadata in a central catalog. For example, the central catalog stores structural and operational metadata for data assets. In this example, the central catalog also stores table definitions, physical locations, add business relevant attributes, as well as track how the data has changed over time. The data lake formation 204 crawls and reads data sources, such as the data source 130, to extract technical metadata and create a searchable catalog to describe the metadata information to make available datasets discoverable to users of the client device 140. Additionally, the data lake formation 204 may transform formats of imported data and/or deduplicate matching records of the imported data. The data lake formation 204 defines security policies (e.g., permissions) of the data lake 114 that restricts access to data at the database, table, column, row, and cell levels. For example, the data lake formation 204 provides row and cell-level security to protect sensitive data like Personal Identifiable Information (PII). The data lake formation 204 enables multiple users to concurrently insert and delete data across tables, while still allowing other users to simultaneously run analytical queries and Machine learning (ML) models on the same datasets that return consistent and up-to-date results.

The data transformation 206 is a visual interface allows data analysts and data scientists to clean and normalize data to prepare the data for analytics and machine learning. The data transformation 206 allows data analysts and data scientists to group multiple transformations together, save the grouped transforms as recipes, and apply the recipes directly to the incoming data of the data lake 114.

The data analytics access 208 is an interface that receives requests/queries of a third-party data analysis tools. The data analytics access 208 provides a plurality of services that enable querying using a standard querying format for data of the data lake 114 that may not have the same format as the query.

Figure 3:
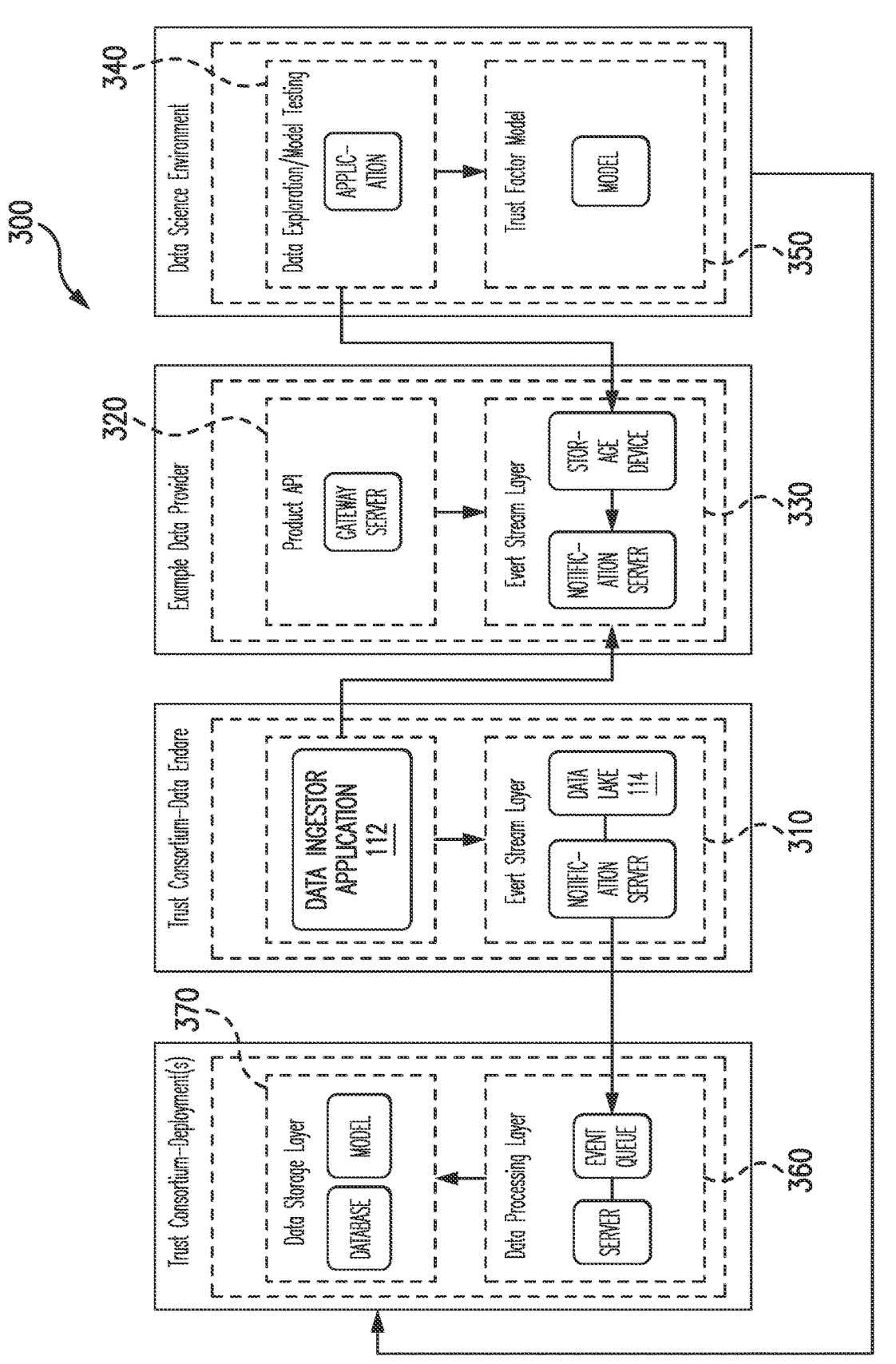
FIG. 3 is a flow diagram illustrating an example of an extensible data warehousing platform ingesting product logs, in accordance with various aspects of the present disclosure.

FIG. 3 is a flow diagram illustrating an example of an extensible data warehousing platform ingesting product logs, in accordance with various aspects of the present disclosure. In the example of FIG. 3, a product log environment 300 includes the data ingestor application 112, a first event stream layer 310, an application programmable interface (API) gateway 320, a second event stream layer 330, a data analytics application 340, a trust model 350, a data processing layer 360, and a data storage layer 370.

The first event stream layer 310 may include a notification server and a storage device. The functionality described herein as being performed by the first event stream layer 310 may be performed by the notification server (via an electronic processor executing instructions) and the storage device, such as, for example, a container that includes the data lake 114. The notification server provides event stream processing. Events are streamed into the first event stream layer 310 from the data ingestor application 112. For example, an event is written to the first event stream layer 310 when the data ingestor application 112 generates a metadata catalog associated with a product log of the second event stream layer 330 being added to the data lake 114 when the catalog and the product log are stored in the storage device. An event streamed into the event stream layer 310 may be stored in the storage device and/or transmitted to the data processing layer 360 for further processing. The first event stream layer 310 may include an event aggregation component (not shown) that aggregates events for bulk or batch processing by, for example, the data processing layer 360. In some embodiments, the first event stream layer 310 triggers the data processing layer 360 (for example, with an event notification) to, for example, access and process one or more events stored in an event queue of the data processing layer 360.

The API gateway 320 functions as an entry point to the product log environment 300. In some embodiments, the API gateway 320 serves as the only publicly accessible entry point to the product log environment 300. As such, the API gateway 320 is configured to receive one or more requests from an application of the client device 140 and process the received requests, and, ultimately, trigger application functionality in the product log environment 300. Accordingly, in some embodiments, the API gateway 320 contains or functions as an application programmable interface ("API") gateway server. For example, the API gateway server includes an electronic processor, a memory, and a communication interface. In some embodiments, the API gateway 320 includes multiple technology components (not shown) incorporated into a single layer that serves a functional purpose. For example, the API gateway 320 may include technology components that implement edge security technology, enforce encryption protocols, and the like.

The second event stream layer 330 may include a notification server and a storage device. The functionality described herein as being performed by the second event stream layer 330 may be performed by the notification server (via an electronic processor executing instructions) and the storage device, such as, for example, a container. The notification server provides event stream processing. Events are streamed into the second event stream layer 330 from the API gateway 320. For example, an event is written to the second event stream layer 330 when the API gateway 320 processes a request from the client device 140. An event streamed into the second event stream layer 330 may be stored in the storage device. The second event stream layer 330 may include an event aggregation component (not shown) that aggregates events for bulk or batch processing by, for example, the data ingestor application 112. In some embodiments, the second event stream layer 330 triggers the data ingestor application 112 (for example, with an event notification) to, for example, access and process one or more events stored in the storage device of the second event stream layer 330.

The data analytics application 340 provides an application that allows data scientists and developers to build and train machine learning models using product logs stored in the storage device of the second event stream layer 330. Machine learning models built using the data analytics application 340 may be shared to/deployed on embedded systems and edge-devices. For example, the trust model 350 is a machine learning model built using the data analytics application 340. In this example, the trust model 350 is shared to the data storage layer 370 for use by the data processing layer 360.

The data processing layer 360 may include a data processing server and an event queue. The functionality described herein as being performed by the data processing layer 360 may be performed by the data processing server (via an electronic processor executing instructions). The data processing server is configured to receive one or more events from the event queue and update a database of the data storage layer 370. For example, the data processing server may update the database of the data storage layer 370 in response to a message of the message queue associated with an event notification of the first event stream layer 310.

The data storage layer 370 may include a database and shared models. In some embodiments, the data storage layer 370 may include additional, fewer, or different components or databases than those illustrated. For example, in some embodiments, the database may be distributed among multiple databases. In this example, the database stores updates to the data lake 114.

Figure 4:
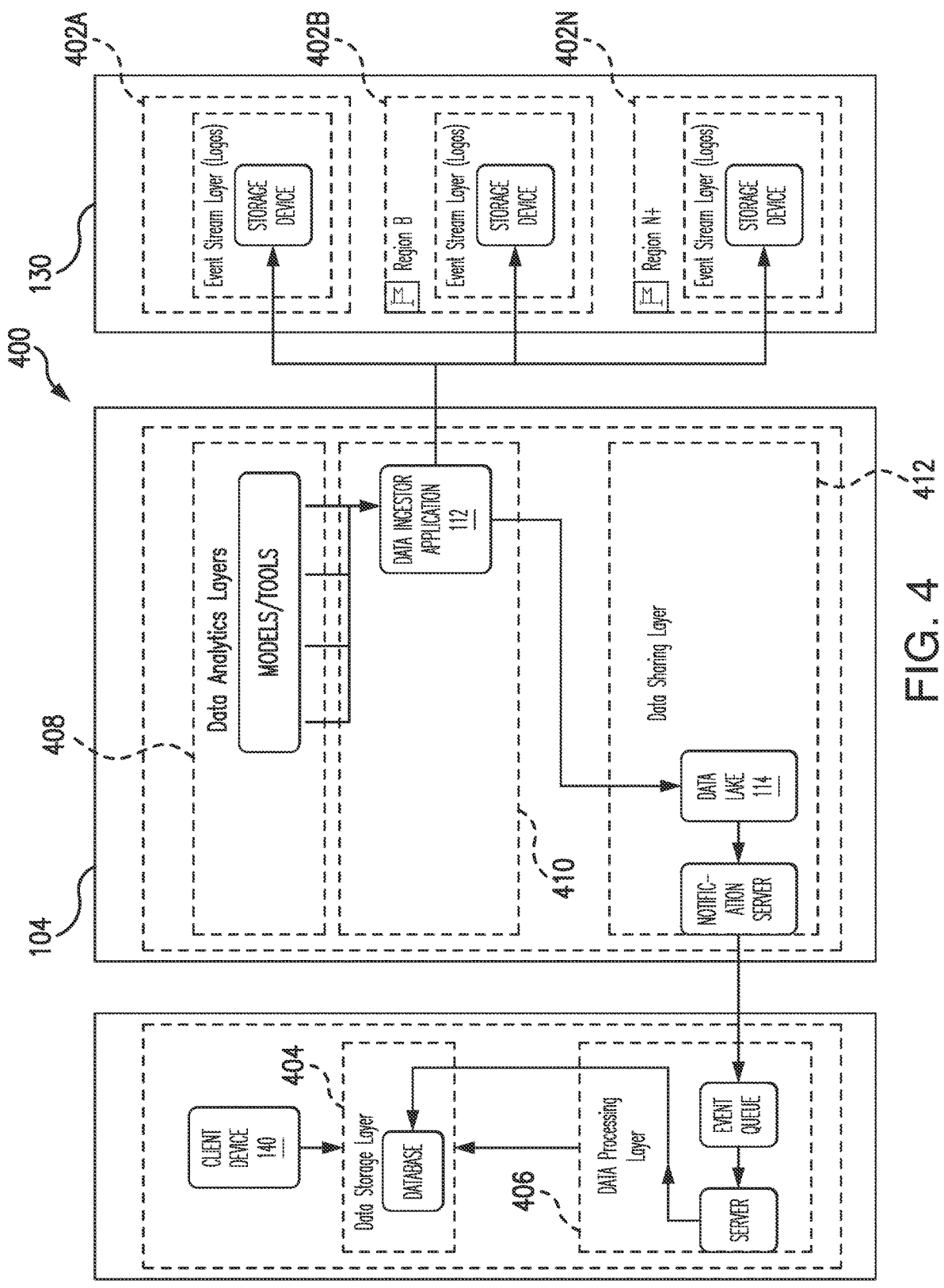
FIG. 4 schematically illustrates an example communication or data flow for a tiered application pattern of a data processing environment, in accordance with various aspects of the present disclosure.

FIG. 4 schematically illustrates an example communication or data flow for a tiered application platform of a data processing environment 400, in accordance with various aspects of the present disclosure. The data processing environment 400 forms a data lake using the enclave server 104 and attack information received from the data source 130. The data processing environment 400 updates a database associated with the data lake to generate a response to a request from the client device 140. In the example of FIG. 4, the data processing environment 400 includes event stream layer 402A-N, a data storage layer 404, a data processing layer 406, a data analytics layer 408, a data engineering layer 410, and a data sharing layer 412. In some embodiments, the data processing environment 400 may include additional, different, or fewer layers than illustrated in FIG. 4 in various configurations. Additionally, each layer may include additional, different, or fewer components than illustrated in FIG. 4 in various configurations.

The event stream layers 402A-N may include a storage device. The functionality described herein as being performed by the event stream layers 402A-N may be performed by the storage device, such as, for example, a container that includes attack information associated with Internet Protocol (IP) and/or email addresses. In an embodiment, the event stream layers 402A-N each include storages device that store attack information from a plurality of customer devices.

The data storage layer 404 may include a storage device. The functionality described herein as being performed by the data storage layer 404 may be performed by the storage device that includes a database. In an embodiment, the data storage layer 404 includes a database that stores an instance of the data lake 114, which is formed using the attack information from a plurality of customer devices ingested from the event stream layers 402A-N. In another embodiment, the data storage layer 404 is utilized to generate a response to the request of the client device 140. For example, a database of the data storage layer 404 is utilized to validate that a data attribute (e.g., IP address) of a request of the client device 140 is valid. In some embodiments, the data storage layer 404 may include additional, fewer, or different components or databases than those illustrated. For example, in some embodiments, the database may be distributed among multiple databases. In this example, the database stores updates to the data lake 114.

The data processing layer 406 may include a data processing server and an event queue. The functionality described herein as being performed by the data processing layer 406 may be performed by the data processing server (via an electronic processor executing instructions). The data processing server is configured to receive one or more events from the event queue and update a database of the data storage layer 404. For example, the data processing server may update the database of the data storage layer 404 in response to message of the message queue associated with an event notification of the data sharing layer 412. In this example, the data processing layer 406 migrates data from one or more source databases (e.g., the data lake 114) to one or more target databases of the data storage layer 404 by using a database migration service. Alternatively, the data processing layer 406 may create a data pipeline between the data processing layer 406 and the data storage layer 404 to update the database of the data storage layer with attack information from the data sharing layer 412.

The data analytics layer 408 provides an interface that allows data scientists and developers query the data in the data lake 114. The data analytics layer 408 is configured to perform the functionality described above in reference to the data analytics access 208 of FIG. 2. In an embodiment, data scientists and developers query the data in the data lake 114 and create exported data views using the data by the data lake 114 from the event stream layers 402A-N. The exported data views may be exported into real-time runtime environments.

The data engineering layer 410 includes the data ingestor application 112. The data engineering layer 410 ingests the data of the storage devices of the event stream layers 402A-N and forms the data lake 114. The data engineering layer 410 is configured to perform the functionality described above in reference to the task operation 200 of FIG. 2. In an embodiment, data engineering layer 410 transmits the data lake 114 to the data sharing layer 412.

The data sharing layer 412 may include a notification server and a storage device. The functionality described herein as being performed by the data sharing layer 412 may be performed by the notification server (via an electronic processor executing instructions) and the storage device, such as, for example, a container that includes the data lake 114. The notification server provides event stream processing. Events are streamed into the data processing layer 406 from the data sharing layer 412. For example, an event is written to the data processing layer 406 when the storage device of the data sharing layer 412 triggers a sharing mechanism. In an embodiment, updates to the data lake 114 stored in the storage device of the data sharing layer 412 and the updates or the data lake 114 that is updated are transmitted to the data processing layer 406.

Figure 5:
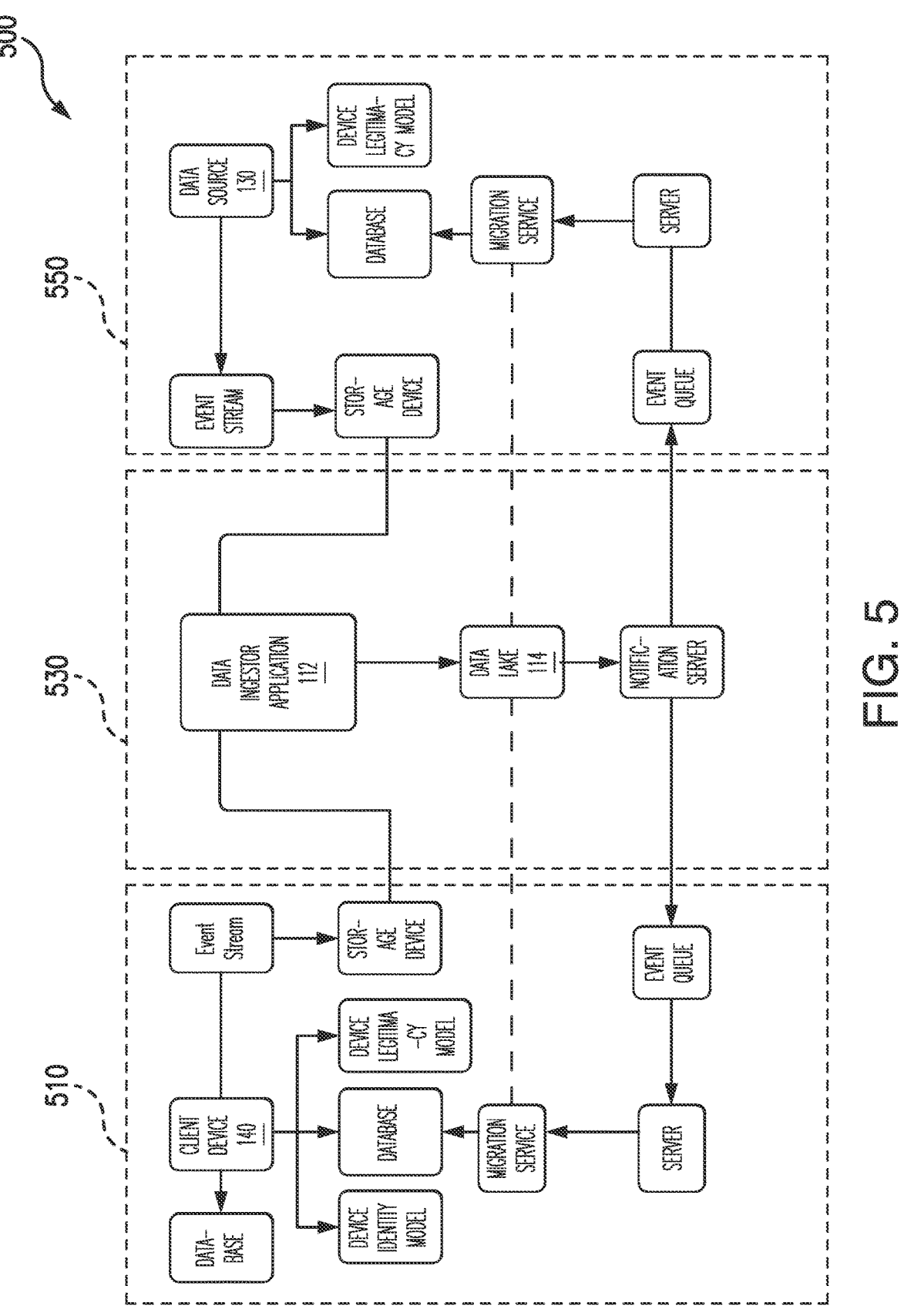
FIG. 5 schematically illustrates an example communication or data flow for an example of forming an extensible data warehousing platform with built-in data security controls, in accordance with various aspects of the present disclosure.

FIG. 5 schematically illustrates an example communication or data flow for an example of a trust consortium platform 500, in accordance with various aspects of the present disclosure. The trust consortium platform 500 forms a data lake using the data ingestor application 112 and device information to update the data lake a database associated with the data lake to process a request from the client device 140. In the example of FIG. 5, the trust consortium platform 500 includes a trusted device 510, a device data enclave 530, and a trusted consortium 550. In some embodiments, the trust consortium platform 500 may include additional, different, or fewer devices than illustrated in FIG. 5 in various configurations. Additionally, each device may include additional, different, or fewer components than illustrated in FIG. 5 in various configurations.

The trusted device 510, may include the client device 140, one or more databases, an event stream, a storage device, one or more machine learning/AI models, a migration service, a server, and an event queue. The functionality described herein as being performed by the trusted device 510 may be performed by a trusted device server (via an electronic processor executing instructions). In an embodiment, the trusted device server is configured to receive one or more requests from the client device 140. The trusted device server may stream one or more events associated with the requests to a storage device. The trusted device server may process a request using the database and/or one or more machine learning/AI models. For example, the trusted device server may create a device identifier, validate device attributes, and determine the legitimacy of a device based on a device reputation history. In this example, the trusted device utilizes a device dataset of a database associated with the data lake 114.

In some instances, the request requires making a change, such as, creating a device identifier, to a device dataset of a database. In these instances, the trusted device server may stream an event to the storage device. In other instances, the request requires performing a validation of device attributes (e.g., identification) or determining a device reputation (e.g., legitimate or illegitimate). In these instances, the trusted device server may store device attributes in a database to track velocity.

In an embodiment, the trusted device server is configured to receive event notifications, which are associated with updates to the data lake 114, from the event queue and update the device database of the trusted device 510. For example, the trusted device 510 migrates data from one or more source databases (e.g., the data lake 114) to one or more target databases of the trusted device 510 by using a database migration service. The association with the data lake 114 enables the trusted device to utilize the most up to date information regarding devices from the trust consortium 550 to process requests.

The device data enclave 530 may include the data ingestor application 112, the data lake 114, and a notification server. The functionality described herein as being performed by the trusted device 510 may be performed by a device data enclave server (via an electronic processor executing instructions). The device data enclave server is configured to perform the functionality described above in reference to the task operation 200 of FIG. 2. In an embodiment, the device data enclave server receives one or more events from the trusted device 510 and/or the trust consortium 550 and forms the data lake 114. In some embodiments, the device data enclave server updates the data lake 114 using the one or more events received from the trusted device 510 and/or the trust consortium 550. The device data enclave server is configured to transmit the data lake 114 or update to the data lake 114 to the trusted device 510 and/or the trust consortium 550 in near real-time. In an embodiment, the device data enclave server generates an update notification associated with an update to the data lake 114 and transmit the notification to the trusted device 510 and/or the trust consortium 550. The notification triggers migration of data by the trusted device 510 and/or the trust consortium 550.

The trust consortium 550 may include the data source 130, one or more databases, an event stream, a storage device, one or more machine learning/AI models, a migration service, a server, and an event queue. In an embodiment, the one or more databases is formed by a collection of data sources from trusted (e.g., verified, authorized) client devices. The functionality described herein as being performed by the trust consortium 550 may be performed by a trusted consortium server (via an electronic processor executing instructions). In an embodiment, trusted consortium server is configured to receive one or more requests. The trusted consortium server may stream one or more events associated with the requests to a storage device.

The trusted consortium server may process a request using the data base and/or one or more machine learning/AI models. For example, the trusted consortium server may validate device attributes and determine the legitimacy of a device based on a device reputation history. In this example, the trusted consortium server utilizes a device dataset of a database associated with the data lake 114. In an embodiment, the trusted consortium server is configured to receive event notifications, which are associated with updates to the data lake 114, from the event queue and update the device database of the trust consortium 550. For example, the trust consortium 550 migrates data from one or more source databases (e.g., the data lake 114) to one or more target databases of the trust consortium 550 by using a database migration service.

Figure 6:
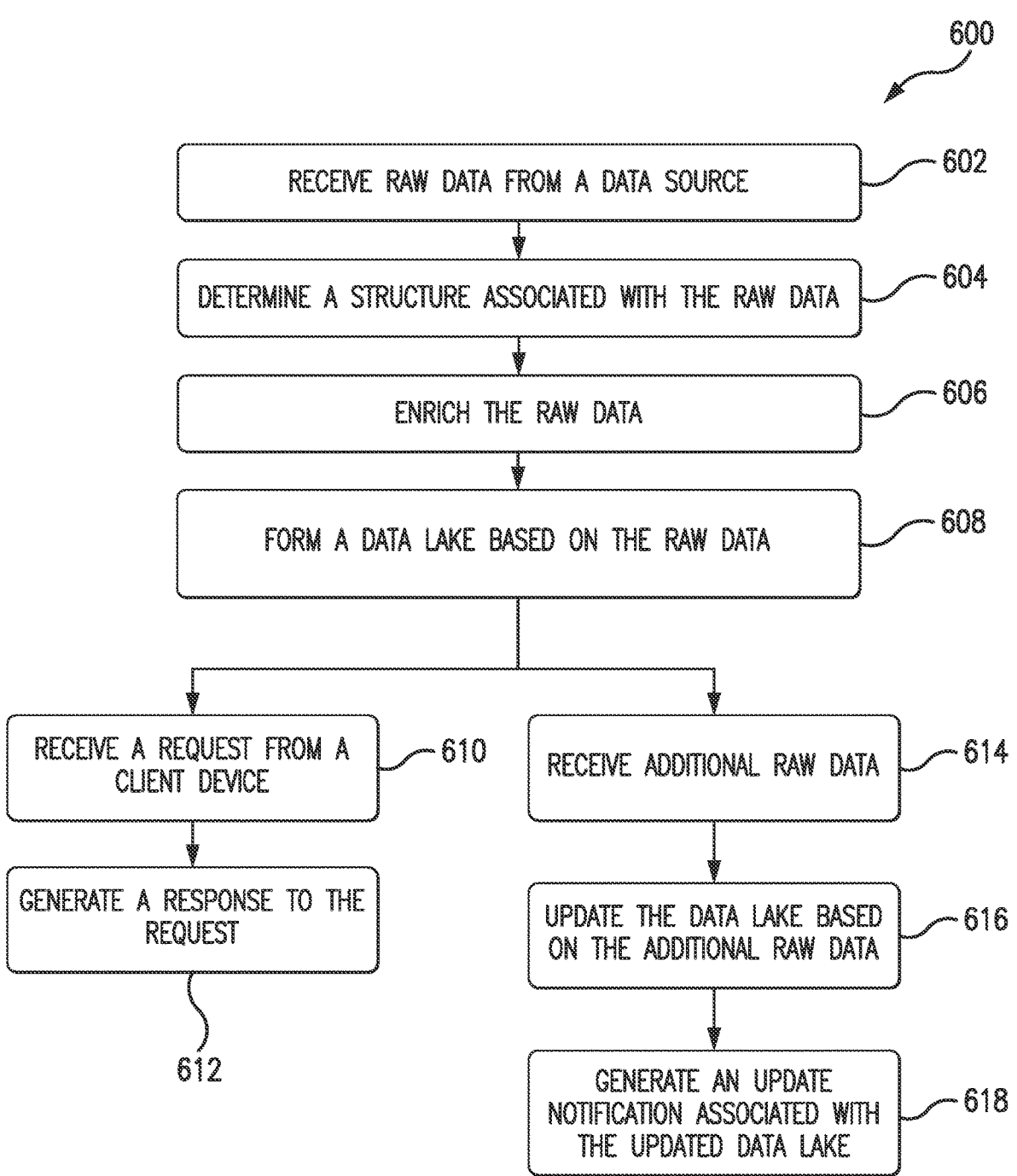
FIG. 6 is a flow diagram illustrating an example process for forming an extensible data warehousing platform with built-in data security controls, in accordance with various aspects of the present disclosure.

FIG. 6 is a flow diagram illustrating an example process 600 for forming an extensible data warehousing platform with built-in data security controls, in accordance with various aspects of the present disclosure. In the example of FIG. 6, the process 600 is described in a sequential flow, however, some of the process 600 may also be performed in parallel.

The process 600 receives raw data from a data source (at block 602). For example, the data enclave server 104 receives raw data 116 from the data source 130. In some embodiments, the data enclave server 104 periodically receives raw data 116 from the data source 130. In other embodiments, the data enclave server 104 continuously receives raw data 116 from the data source 130.

The process 600 determines a structure associated with the raw data (at block 604). For example, the data ingestor application 112 determines a format, schema, and/or associated properties of the raw data 116. In another example, the structure associated with the raw data may be one structure from a plurality of structures including an array structure, a linked list structure, a stack structure, a queue structure, a hash table structure, a tree structure, a heap structure, and a graph structure. In some implementations, the data ingestor application 112 identifies missing attributes of the raw data 116.

The process 600 enriches the raw data (at block 606). For example, the data ingestor application 112 utilizes the determined structure associated with the raw data 116 to map missing attributes to a correct place in a record. As a result of the mapping, the raw data 116 is usable to derive insights using analytics tools.

The process 600 forms a data lake based on the raw data (at block 608). For example, the data ingestor application 112 combines the raw data 116 in a central repository to form the data lake 114 and creates a catalog of descriptive metadata associated with the data lake 114. The catalog allows for use of a standardized query to locate data within the data lake 114 regardless of the structure of the raw data 116. As a result, the queries on the data lake 114 do not break due to incompatible structures of the queries and the raw data 116. Additionally, the formation of the lake using the structure of the data also avoids corruption of the data lake 114 and reduces offline time due to repair.

The process 600 may receive a request from a customer device (at block 610). For example, the enclave server 104 may receive a request from the client device 140. The request may be associated with a query on the data lake 114 to verify a trusted device, identify device, determine device legitimacy, and/or grant access to data of the data lake 114. The process 600 generates a response to the request (at block 612). For example, the data lake 114 is accessed to generate a response to a request from the client device 140.

The process 600 may also receive additional raw data (at block 614). In some examples, the enclave server 104 receives additional raw data from the data source 130 and the additional raw data supplements the raw data. The data source 130 provides the additional raw data associated with a fast-paced product development environment where the data structure of the raw data may change unexpectedly. Therefore, the enclave server 104 may receive additional raw data with varying data structures (e.g., NOSQL and the like) and mutating attributes that break data analysis and big data pipeline tools. The varying nature of the additional raw data may result in the data lake 114 becoming non-functional when the additional raw data is not structured properly, limiting the potential use of the additional raw data to derive insights from the data lake 114. In an embodiment, the enclave server 104 detects a structure associated with the additional raw data, enriches the additional raw data, and combines and catalogs the additional raw data with other data (e.g., raw data 116) of the data lake 114. For example, the enclave server 104 detects the structure of a dataset associated with the additional raw data and determines whether the additional raw data is comma or pipe separated data with line breaks, or the like. In this example, the enclave server 104 utilizes the structure of the dataset to ingest data received in the future. In some embodiments, the data enclave server 104 periodically receives additional raw data from the data source 130. In other embodiments, the data enclave server 104 continuously receives additional raw data from the data source 130. In some embodiments, the data enclave server 104 horizontally, by adding more machines or servers to distribute the workload across, scale resources to receive the additional raw data having the plurality of structures.

The process 600 updates the data lake based on the additional raw data (at block 616). For example, the enclave server 104 utilizes the data ingestor application 112 to update the data lake 114 using the additional raw data. In some embodiments, the data enclave server 104 modifies the data lake 114 using the additional raw data. For example, the additional raw data can include a change to a dataset of the data lake 114.

The process 600 generates an update notification associated with the updated data lake (at block 618). For example, the data ingestor application 112 generates an event notification that is associated with an update to the data lake 114. The notification may trigger the data ingestor application 112 to push the update of the data lake 114 to one or more clients subscribed to a product service associated with the data lake 114.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It should thus be noted that the matter contained in the above description or shown in the accompanying drawings is to be interpreted as illustrative and not in a limiting sense.

It should also be noted that a plurality of hardware and software-based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software-based devices, as well as a plurality of different structural components may be utilized to implement the invention. For example, "control units" and "controllers" described in the specification can include one or more electronic processors, one or more memories including a non-transitory computer-readable medium, one or more input/output interfaces, and various connections (for example, a system bus) connecting the components.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable connections or links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations collectively. To reiterate, those electronic processors and processing may be distributed.

What is claimed is:

1. A system for forming an extensible data warehouse, the system comprising:
   a client device including a first electronic processor and a first memory;
   a storage device including a second electronic processor and a second memory, the storage device associated with the client device; and
   a server including a third electronic processor and a third memory including a data ingestor application, the third electronic processor configured to:
      receive, with a data ingestor application, raw data having a first structure,
      create, with the data ingestor application, a first metadata table for the raw data using an input crawler, the input crawler extracting metadata of the raw data,
      format, with the data ingestor application, the raw data for storage by performing an extract operation, a transform operation, and a load operation on the raw data,
      create, with the data ingestor application, a second metadata table for the raw data using an output crawler, the output crawler extracting metadata of the raw data that is formatted for storage,
      form, with the data ingestor application, a data lake in the third memory using the raw data, create, with the data ingestor application using the first metadata table and the second metadata table, a catalog describing the raw data of the data lake,
continuously receive, with the data ingestor application, additional raw data having a plurality of structures, wherein the plurality of structures includes the first structure and one or more different structures, and wherein the additional raw data supplements the raw data,
determine, with the data ingestor application, each structure of the plurality of structures,
generate, with the data ingestor application, a dataset based on the additional raw data and the plurality of structures that are determined,
extract, with the data ingestor application, metadata associated with the additional raw data from the dataset,
update, with the data ingestor application, the catalog for the data lake-based on the metadata that is extracted from the additional raw data, and
modify, with the data ingestor application, the data lake in the third memory to include the additional raw data based on the dataset and the catalog that is updated.

2. The system of claim 1, wherein, to receive, with the data ingestor application, the additional raw data having the plurality of structures, the third electronic processor is further configured to horizontally scale resources to receive the additional raw data having the plurality of structures.

3. The system of claim 1, wherein the third electronic processor is further configured to:
   receive, with the data ingestor application, an event notification associated with a change to a dataset stored in the first memory or the second memory, wherein the change is a result of the first electronic processor or the second electronic processor processing a request, and wherein the additional raw data is associated with the change to the dataset stored in the first memory or the second memory,
   modify, with the data ingestor application, the data lake in the third memory based on the change to the dataset stored in the first memory or the second memory,
   generate, with the data ingestor application, an event stream associated with the event notification, and
   transmit, with the data ingestor application via the event stream, the data lake that is modified based on the change to the dataset stored in the first memory or the second memory to a device of the system for storage in memory.

4. The system of claim 1, wherein generating the dataset based on the additional raw data and the plurality of structures that are determined, the third electronic processor is further configured to:
   classify, with the data ingestor application, a source file of the additional raw data based on a structure of the source file,
   format, with the data ingestor application, the additional raw data that is classified, wherein the additional raw data that is formatted is stored in the data lake,
   classify, with the data ingestor application, the source file of the additional raw data that is formatted based on a size of the source file of the additional raw data that is formatted,
   compact, with the data ingestor application, the source file of the additional raw data that is that is classified as small with a source file of the additional raw data that is classified as large into a larger source file, and store, with the data ingestor application, the additional raw data that is compacted in the data lake.

5. The system of claim 4, wherein generating the dataset based on the additional raw data and the plurality of structures that are determined, the third electronic processor is further configured to:

define, with the data ingestor application, security policies to restrict permissions to access to the additional raw data of the data lake, and update, with the data ingestor application, the security policies of the data lake in near real-time using the additional raw data, wherein the additional raw data stored in the second memory of the storage device is provided by an authorized collective of computing devices.

6. The system of claim 4, wherein each structure of the plurality of structures that is determined is based on a file format and database schema associated with the raw data and the additional raw data.

7. The system of claim 1, wherein each structure of the plurality of structures includes a structure type selected from a group consisting of: an array structure, a linked list structure, a stack structure, a queue structure, a hash table structure, a tree structure, a heap structure, and a graph structure.

8. A method for forming an extensible data warehouse, the method comprising:

receiving, with a data ingestor application, raw data having a first structure;

creating, with the data ingestor application, a first metadata table for the raw data using an input crawler, the input crawler extracting metadata of the raw data;

formatting, with the data ingestor application, the raw data for storage by performing an extract operation, a transform operation, and a load operation on the raw data;

creating, with the data ingestor application, a second metadata table for the raw data using an output crawler, the output crawler extracting metadata of the raw data that is formatted for storage;

forming, with the data ingestor application, a data lake in a third memory of a server using the raw data;

creating, with the data ingestor application using the first metadata table and the second metadata table, a catalog describing the raw data of the data lake;

continuously receiving, with a data ingestor application, additional raw data having a plurality of structures, wherein the plurality of structures includes the first structure and one or more different structures, and wherein the additional raw data supplements the raw data;

determining, with the data ingestor application, each structure of the plurality of structures;

generating, with the data ingestor application, a dataset based on the additional raw data and the plurality of structures that are determined;

extracting, with the data ingestor application, metadata associated with the additional raw data from the dataset;

updating, with the data ingestor application, the catalog for the data lake based on the metadata that is extracted from the additional raw data; and modifying, with the data ingestor application, the data lake in the third memory to include the additional raw data based on the dataset and the catalog that is updated.

9. The method of claim 8, wherein, to receive, with the data ingestor application, the additional raw data having the plurality of structures, the method further comprises:

receiving, by horizontally scaled resources, the additional raw data having the plurality of structures.

10. The method of claim 8, further comprising:

receiving, with the data ingestor application, an event notification associated with a change to a dataset stored in a first memory of a client device or a second memory of a storage device, wherein the change is a result of a first electronic processor of a client device or a second electronic processor of a storage device processing a request, and wherein the additional raw data is associated with the change to the dataset stored in the first memory or the second memory;

modifying, with the data ingestor application, the data lake in the third memory based on the change to the dataset stored in the first memory or the second memory;

generating, with the data ingestor application, an event stream associated with the event notification; and transmitting, with the data ingestor application via the event stream, the data lake that is modified based on the change to the dataset stored in the first memory or the second memory to a device storage in memory.

11. The method of claim 8, wherein generating the dataset based on the additional raw data and the plurality of structures that are determined, further comprises:

classifying, with the data ingestor application, a source file of the additional raw data based on a structure of the source file;

formatting, with the data ingestor application, the additional raw data that is classified, wherein the additional raw data that is formatted is stored in the data lake;

classifying, with the data ingestor application, the source file of the additional raw data that is formatted based on a size of the source file of the additional raw data that is formatted;

compacting, with the data ingestor application, the source file of the additional raw data that is that is classified as small with a source file of the additional raw data that is classified as large into a larger source file; and storing, with the data ingestor application, the additional raw data that is compacted in the data lake.

12. The method of claim 11, wherein generating the dataset based on the additional raw data and the plurality of structures that are determined, further comprises:

defining, with the data ingestor application, security policies to restrict permissions to access to the additional raw data of the data lake; and updating, with the data ingestor application, the security policies of the data lake in near real-time using the additional raw data, wherein the additional raw data stored in a second memory of a storage device is provided by an authorized collective of computing devices.

13. The method of claim 11, wherein each structure of the plurality of structures that is determined is based on a file format and database schema associated with the raw data and the additional raw data.

14. The method of claim 8, wherein each structure of the plurality of structures includes a structure type selected from a group consisting of: an array structure, a linked list structure, a stack structure, a queue structure, a hash table structure, a tree structure, a heap structure, and a graph structure.

15. A non-transitory computer-readable medium comprising instructions for forming an extensible data warehouse that, when executed by an electronic processor, cause the electronic processor to perform a set of operations comprising:

receiving raw data having a first structure;

creating a first metadata table for the raw data using an input crawler, the input crawler extracting metadata of the raw data;

formatting the raw data for storage by performing an extract operation, a transform operation, and a load operation on the raw data;

creating a second metadata table for the raw data using an output crawler, the output crawler extracting metadata of the raw data that is formatted for storage;

forming a data lake in a third memory using the raw data;

creating, using the first metadata table and the second metadata table, a catalog describing the raw data of the data lake;

continuously receiving additional raw data having a plurality of structures, wherein the plurality of structures includes the first structure and one or more different structures, and wherein the additional raw data supplements the raw data;

determining each structure of the plurality of structures;

generating a dataset based on the additional raw data and the plurality of structures that are determined;

extracting metadata associated with the additional raw data from the dataset;

updating the catalog for the data lake based on the metadata that is extracted from the additional raw data; and modifying the data lake in the third memory to include the additional raw data based on the dataset and the catalog that is updated.

16. The non-transitory computer-readable medium of claim 15, wherein, to receive the additional raw data having the plurality of structures, the set of operations further comprises:

receiving, by horizontally scale resources, the additional raw data having the plurality of structures.

17. The non-transitory computer-readable medium of claim 15, further comprising:

receiving an event notification associated with a change to a dataset stored in a first memory of a client device or a second memory of a storage device, wherein the change is a result of a first electronic processor of the client device or a second electronic processor of the storage device processing a request, and wherein the additional raw data is associated with the change to the dataset stored in the first memory or the second memory;

modifying the data lake in the third memory based on the change to the dataset stored in the first memory or the second memory;

generating an event stream associated with the event notification; and transmitting, via the event stream, the data lake that is modified based on the change to the dataset stored in the first memory or the second memory to the client device or the storage device.

18. The non-transitory computer-readable medium of claim 15, wherein generating the dataset based on the additional raw data and the plurality of structures that are determined, further comprises:

classifying a source file of the additional raw data based on a structure of the source file;

formatting the additional raw data that is classified, wherein the additional raw data that is formatted is stored in the data lake;

classifying the source file of the additional raw data that is formatted based on a size of the source file of the additional raw data that is formatted;

compacting the source file of the additional raw data that is that is classified as small with a source file of the additional raw data that is classified as large into a larger source file; and storing the additional raw data that is compacted in the data lake.

19. The non-transitory computer-readable medium of claim 18, wherein generating the dataset based on the additional raw data and the plurality of structures that are determined, further comprises:

defining security policies to restrict permissions to access to the additional raw data of the data lake; and updating security policies of the data lake in near real-time using the additional raw data, wherein the additional raw data stored in a second memory of a storage device is provided by an authorized collective of computing devices.

20. The non-transitory computer-readable medium of claim 15, wherein each structure of the plurality of structures includes a structure type selected from a group consisting of: an array structure, a linked list structure, a stack structure, a queue structure, a hash table structure, a tree structure, a heap structure, and a graph structure.

\* \* \* \* \*